United States Patent
Coquelin

[15] 3,663,134
[45] May 16, 1972

[54] APPARATUS FOR MANUFACTURE OF TUBULAR COMPONENTS FROM PLASTICS MATERIAL

[72] Inventor: Robert Coquelin, Mazingarbe, France
[73] Assignee: Ethylene-Plastique, Paris, France
[22] Filed: Oct. 14, 1968
[21] Appl. No.: 767,238

[30] Foreign Application Priority Data

Oct. 13, 1967   France..................................124,440
Oct. 1, 1968    France..................................168,309

[52] U.S. Cl. ..................................425/72, 18/14 A, 425/84, 264/95, 264/99, 264/209, 264/237, 264/348
[51] Int. Cl........................................................B29d 23/04
[58] Field of Search....................264/95, 99, 209, 237, 348; 18/14 A, 14 M, 14 S

[56] References Cited

UNITED STATES PATENTS

| | | | |
|---|---|---|---|
| 2,337,927 | 12/1943 | Reichel et al. | 264/95 UX |
| 2,433,937 | 1/1948 | Tornberg | 264/95 UX |
| 2,245,640 | 6/1941 | Beattie | 264/176 |
| 3,008,186 | 11/1961 | Voigt | 18/14 S |

FOREIGN PATENTS OR APPLICATIONS 853,745   11/1960   Great Britain.........................264/209

Primary Examiner—Robert F. White
Assistant Examiner—Jeffery R. Thurlow
Attorney—Pennie, Edmonds, Morton, Taylor & Adams

[57] ABSTRACT

Apparatus for cooling extruded tube including a means for passing said tube through a tensioned, flexible, resilient, liquid permeable sleeve surrounding said tube having a means for applying liquid coolant to the surface of said sleeve and means for wiping said tube after passing said sleeve.

4 Claims, 1 Drawing Figure

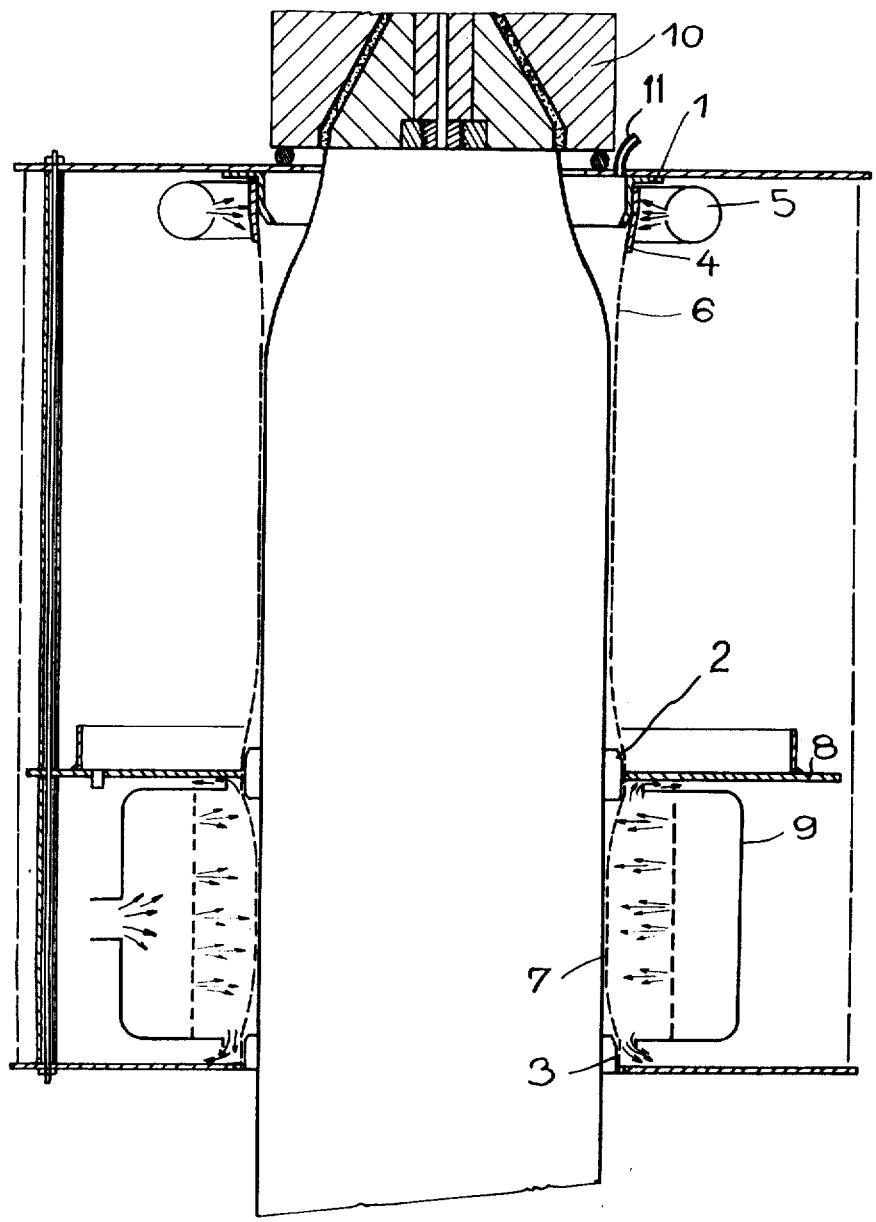

APPARATUS FOR MANUFACTURE OF TUBULAR COMPONENTS FROM PLASTICS MATERIAL

This invention is concerned with the manufacture of tubular components, particularly tubular film, from plastic material.

Methods of making thermoplastic tubular components by extrusion and blowing are well known and widely used in industry. Other things being equal, however, it is known that the rate of production and the properties of the tubular components made by these methods are closely dependent on the efficiency with which the melted material is cooled after leaving the extruder. This dependence is particularly important in the case of crystalline plastic materials, such as polyethylenes, polypropylenes, polybutenes and polyamides. A number of cooling devices have been suggested. More particularly, the tubular component can be placed in contact with a cold external or internal wall which gives the tube its final diameter, or the component can be immersed in a bath of water. These arrangements are, however, difficult to operate in practice because of the frequent adjustments necessary, either to the cooling elements or to eliminate irregularities in the contact between the melted material and the cooling surface which result in non-uniform cooling over a period of time and sometimes in breakage after the component has stuck to the wall.

We have now developed an improved cooling means which reduces or removes the operational difficulties mentioned above and which enables productivity to be increased to the extent permitted by the limitations of the extrusion and reception means.

According to the present invention we provide a method of cooling an extruded plastic tubular component immediately following extrusion, in which the tubular component is cooled and formed to size by contact with a flexible, slightly resilient, porous, hydrophilic wall which surrounds the tubular component and which carries a film of cooling liquid.

According to another aspect of the invention, we provide apparatus for cooling an extruded plastic tubular component immediately following extrusion, which comprises a flexible, slightly resilient, porous, hydrophilic tubular element located immediately downstream of the extrusion head and centered on the extrusion axis and means for applying cooling liquid to the flexible tubular element.

This method and apparatus can be used in the manufacture of films, sheaths, pipes and tubes.

When plastic sheaths or tubular films are extruded, the plastic sheath is blown and pressed against the flexible cooling sleeve by gas pressure inside the sheath. Since, as is known, the cooling of the internal surface of the plastic sheath may have an important effect on its mechanical and optical properties, internal cooling can be carried out by any known, effective system. The method and apparatus according to the invention enables the gas pressure between the cooling sleeve and the surface of the plastic sheath, in the space between the extrusion head and the line of contact between the sleeve and the sheath, to be adjusted so that the sheath is manufactured under optimum conditions. This pressure (i.e., that between the cooling sleeve and the surface of the plastic sheath) is slightly less than that inside the sheath but may be kept slightly less, or preferably slightly greater than or equal to, the pressure outside the cooling sleeve.

The pressure outside the cooling sleeve is generally equal to atmospheric pressure, since the cooling sleeve is generally supported in an open frame. If necessary, the frame supporting the cooling sleeve can be enclosed and the pressure in the enclosure can be made slightly different from atmospheric pressure, All these pressures are near atmospheric pressure, since the differential pressures are generally between a few millimeters and a few tens of centimeters of water. As a result, the sheath is blown, formed to size and cooled much more easily and under greatly improved conditions, for the following reasons: the cooling sleeve is flexible and resilient, the wall in contact with the sheath is moist and enables it to slide more easily, a wider range of pressure is available, and the optimum values with respect to external atmospheric pressure can be chosen for the pressure outside the cooling sleeve, the pressure in the space between the cooling sleeve and the external surface of the sheath and, of course, the pressure inside the sheath.

As is known, plastic sheaths can be extruded vertically or horizontally. Vertical extrusion is usually preferable because of the uniform cooling achieved by the method according to the invention, but the sheaths can also be extruded horizontally, for example by using the following means:

The cooling sleeve is held and fixed at each end by a rigid ring and is at least partly supported by a frame to which the rings are attached and to which the sleeve is attached or on which it rests. The frame may, for example, be made of rigid metal components forming a squirrel cage to which the sleeve is connected by wires or by any other means for securing it in a suitable position in the center of the cage so as to prevent contact between the sleeve and the metal components. Water can flow freely on the sleeve without being hindered by the metal components or by the connections between the sleeve and the supporting frame. The external structure may also, for example, be a cradle of wires or bands suspended from at least one rigid component of the frame connecting the rings holding the two ends of the sleeve. A row of liquid coolant, e.g., water, nozzles is disposed along or near the upper generator of the sheath to supply the film of cooling liquid thereto and, if desired, one or more pairs of rows of liquid coolant nozzles are disposed symmetrically on either side of the sheath.

Tubes and pipes made by extrusion are generally of smaller diameter than tubular film but their thickness is much greater and can vary from a few tenths of a millimeter to several millimeters, or even exceed a centimeter. The $e/D$ ratios are therefore much higher, generally from 10 to 100 times and sometimes more than the case of tubular film manufacture. The pressure required to expand the pipe is from 100 g. to 1 kg./cm$^2$. In the conventional method, when the pipe leaves the extrusion die, it is drawn through a metal cylinder acting as a gauge for the final pipe diameter and which is cooled by water flowing in a jacket. The pipe is pressed against the wall of the gauge either by internal pressure or by negative pressure applied to the exterior or by both. Cooling is then continued by immersion or by spraying the tube.

The disadvantage of the conventional method is that the tube, which is still plastic, adheres strongly to the gauge wall and that the tensile force needed to make is slide is sometimes greater than the strength of the material in its plastic state. Furthermore, the rate of cooling is reduced by the low thermal exchange between the plastic material and the gauge, which, in turn, is due to the dry contact surface.

It is difficult, in short, to construct the gauge so that it has a suitable surface. Once again, the speed of extrusion is limited by the cooling capacity of the gauge. If the gauge is too long, the pipe takes too long to slide and breaks or jams. If the gauge is too short, the pipe is not cooled sufficiently to withstand internal pressure without expanding, or to retain its shape during the second cooling phase.

The method according to the present invention can b used to mould plastic tubes of widely varying diameters and thicknesses. In this case, the preferred arrangement is for the cooling sleeve to be solidly fixed to a flange which, in turn, is secured in the immediate neighborhood of the extrusion die, leaving the other end of the cooling sleeve free or fixed to a sliding ring. Under the combined effects of tensile force and pressure, the cooling sleeve very slightly changes its shape in a reversible manner and becomes shorter and thicker or longer and a few millimeters thinner. The sliding ring, in turn, is guided and supported. The cooling sleeve is copiously sprayed with water or other liquid coolant.

The tube can, in consequence, be effectively cooled as soon as it leaves the die since the water flowing through the sleeve moistens the plastic tube and improves the heat exchange and the tube slides much more easily on a wet, flexible surface, with the result that the forming gauge, i.e., the cooling sleeve, can be made longer if necessary. In the latter case, of course, because of the relatively high tensile forces applied to the sleeve, the material of which it is made should be strong and disposed so that the warp and weft threads are parallel or perpendicular to the extrusion axis.

When the pipe diameter is so large that the tension on the flexible cooling sleeve would be excessive or require an unduly thick fabric which would act as a screen against water and heat, the sleeve is advantageously supported by a thin metal tube formed with a number of holes or slots which permit the ready passage of water or other liquid coolant. With this arrangement, the advantages conferred by the flexible cooling sleeve, i.e., good thermal contact and a reduced coefficient of friction, are retained.

When the method according to the invention is applied to a tubular film, the exterior surface of the tubular component is wet when it leaves the sleeve. For this reason, it may be necessary to dry the tubular component; various known means can b used for this purpose, but in the present invention, use is preferably made of a drying sleeve made of a resilient, porous and hydrophilic material.

The drying sleeve, which is disposed downstream of the cooling sleeve, is in contact with the outer surface of the tubular component and absorbs water or traces of water from the surface. The drying sleeve is continuously dried by any known means, more particularly by a current of gas, which may, if desired, be heated, which impinge on the external surface of the sleeve. The water absorbed by the internal surface of the drying sleeve passes through it and is evaporated on its external surface. A number of successive wiping or drying sleeves can be provided or the sleeves can be combined with other known drying means.

In order that the invention may be more fully understood, a preferred embodiment thereof will now be described, by way of example only, with reference to the single FIGURE of the accompanying drawing which is a sectional elevation of the apparatus.

The apparatus is arranged for downward vertical extrusion of a tubular film and comprises an extrusion head 10 including an annular die; the extruder in which the plastic material is melted, homogenized and forced to the extrusion head, is not shown. The external surface of the tubular film is cooled by contact with a flexible, slightly resilient sleeve 6 which carries a film of water or other cooling liquid; the sleeve is made of a porous, hydrophilic material. The water or other coolant is supplied at a uniform rate to the outer surface of the sleeve and permeates it to form a thin film of water on the inside. The space between the tubular film, the extrusion head 10 and the sleeve 6 is either open to the atmosphere or connected by a spigot 11 to a pressure-regulating device.

The two ends of the sleeve are held in position by two rigid rings 1 and 2 which expand it slightly and between which it is stretched longitudinally. The upper part of the sleeve may be surrounded by a thick, porous, hydrophilic strip 4, e.g., of cotton felt, which takes the impact of the water spray and distributes it in a uniform flow along the sleeve. Water is sprayed under pressure by a series of nozzles disposed at regular intervals along the inside of a circular manifold 5 centered on the extrusion axis. The lower positioning ring 2 is attached to a tray 8 for receiving water or other coolant flowing down the sleeve 6.

A second, similar sleeve 7 is disposed similarly between positioning rings 2 and 3; sleeve 7 wipes and dries the tubular film. Drying is facilitated by a current of warm, dry air supplied to an annular chamber 9 surrounding the sleeve 7. The current of air evaporates the water which has been wiped off the tubular film by the sleeve 7 and ensures efficient drying.

A film of water is formed on the internal surface of the sleeve 6 with the result that the plastic film slides easily while being cooled, there is excellent contact between the plastic film and the coolant medium, and heat dissipation is provided by the water flowing down the outside of the sleeve. Since the sleeve is resilient, it can follow small variations in the diameter of the tubular film, more particularly, its shrinkage during cooling. As a result, the tubular film to be cooled and the cooling sleeve are in constant contact over the entire useful surface of the sleeve. The sleeve may be made from materials such as fine cotton, flannel, velvet or cotton jersey. It can be woven to shape or made up and sewn. In the latter case, the material is preferably cut so that the seam extends helically. Other textiles can be used, e.g., rayon or mixed cellulose and synthetic fibers.

The methods according to the invention can be applied to all thermoplastic materials normally used for the extrusion of tubular components, e.g., polyvinyl chloride, polystyrene, polyamides, polyesters and polyolefins; it is, however, most advantageously applicable to highly crystalline polymers, such as polyethylene, polypropylene, polybutene and polyamides.

What I claim:

1. Apparatus for cooling an extruded plastic tube upon extrusion thereof, said apparatus comprising a flexible, resilient, liquid-permeable sleeve; means for passing an extruded tubular sheath through the flexible, resilient, liquid permeable sleeve surrounding the tube;
   means for applying a sufficient quantity of liquid coolant to the internal surface of said sleeve by an annular manifold surrounding the sleeve for flowing liquid cooling medium onto the sleeve;
   a first ring supporting one end of the sleeve above the tube in a spaced relationship therefrom;
   a second ring engaging the exterior surface of the tube and holding the sleeve under tension in engagement with the exterior surface of the tube;
   and means to wipe the exterior surface of the tube upon emergence from said second ring.

2. Apparatus according to claim 1 wherein said last-named means comprises a resilient sleeve stretched longitudinally over the tube in contact with the outer surface thereof, and
   means to apply a current of gas to the exterior surface of said last-named sleeve.

3. Apparatus according to claim 1 wherein said first-mentioned means comprises means for passing an extruded plastic tube downwardly upon extrusion thereof through the flexible, resilient, liquid-permeable sleeve; and wherein said second-mentioned means comprises
   means for applying the liquid coolant downwardly over the internal surface of the sleeve between the sleeve and the extruded tube.

4. Apparatus according to claim 1 which further comprises means for maintaining the pressure within the interior of the plastic tube at a magnitude greater than the pressure at the external surface of the sleeve.

* * * * *